United States Patent [19]
Bueler

[11] 3,771,836
[45] Nov. 13, 1973

[54] CONTROL VALVE
[75] Inventor: Richard C. Bueler, Valley, Des Peres, Mo.
[73] Assignee: Wagner Electric Corp., Newark, N.J.
[22] Filed: Sept. 26, 1972
[21] Appl. No.: 292,412

[52] U.S. Cl.................. 303/6 C, 303/84, 188/349, 303/54, 303/52
[51] Int. Cl............................................. B60t 13/12
[58] Field of Search.................. 303/6 C, 6 R, 6 A, 303/84 A, 84 R, 50, 52, 54, 53; 188/349, 151 R, 152

[56] References Cited
UNITED STATES PATENTS
| | | | |
|---|---|---|---|
| 3,152,844 | 10/1964 | Bueler | 303/6 C |
| 3,612,618 | 10/1971 | Swanson | 303/6 C |
| 3,653,722 | 7/1970 | Klimek | 303/6 C |

Primary Examiner—Duane A. Reger
Assistant Examiner—D. C. Butler
Attorney—Joseph E. Papin

[57] ABSTRACT

A control valve for varying brake pressures applied to a front vehicle brakes includes a differential piston having ratio changing valve means therein. The control valve comprises a differential relay means responsive to a control fluid pressure less than a predetermined value selectively subjected thereto to establish an applied fluid pressure in a predetermined ratio with the control fluid pressure, and modulating means in the differential relay means operable generally for performing modulating operations on the control fluid pressure in excess of the predetermined value, said modulating control fluid pressure acting on the differential relay means to assist the actuation thereof and increase the applied fluid pressure in another predetermined ratio with the control fluid pressure.

6 Claims, 2 Drawing Figures

3,771,836

CONTROL VALVE

FIELD OF THE INVENTION

This invention relates generally to vehicle brake systems and in particular to control valves for use therein.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious effect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principle object of the present invention is to provide a control valve for use in a vehicle brake system to predeterminately control fluid pressure applied to the vehicle front axle brakes which overcomes the aforementioned disadvantageous or undersirable features, and this, as well as other objects and advantageous features of the present invention, will become apparent from the specification which follows.

SUMMARY OF THE INVENTION

Briefly, the present invention includes a control valve having differential relay means responsive to a control fluid pressure less than a predetermined value selectively subjected thereto to establish an applied fluid pressure in a predetermined ratio with the control fluid pressure, and modulating means in said differential relay means operable generally for performing modulating operations on the control fluid pressure in excess of the predetermined value, said modulating control fluid pressure acting on said differential relay means to assist the actuation thereof and increase the applied fluid pressure in another predetermined ratio with the control fluid pressure.

RELATED PRIOR ART

This patent application is related to the Richard C. Bueler U.S. Pat. application Ser. No. 282,945 for Control Valve filed Aug. 23, 1972, and assigned to the common assignee of this patent application which is a patentable improvement.

BRIEF DESCRIPTION OF THE DRAWINGS

In the drawings which illustrate an embodiment of the present invention and wherein like numerals refer to like parts wherever they occur.

DETAILED DESCRIPTION OF THE INVENTION

Figure 1:
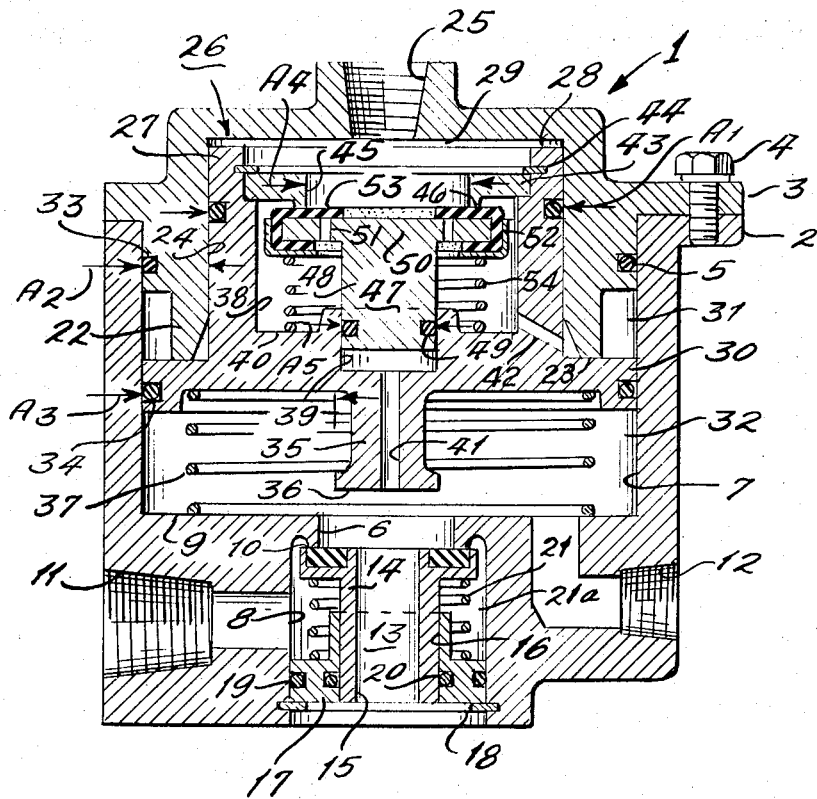
FIG. 1 is a sectional view showing a control valve embodying the present invention in cross-section.

Referring now to the drawings in detail and in particular to FIG. 1, a control valve 1 is provided with a housing 2 having a housing closure member or end plate 3 releasably connected therewith by suitable means well known in the art, such as a plurality of screws 4, and a sealing member, such as the O-ring 5, is sealably disposed between said housing and closure member.

The housing 2 is provided with a bore 6 axially interposed between opposed upper and lower counterbores 7, 8, and shoulders 9, 10 are provided on said housing at the juncture of said bore and counterbores, respectively, said shoulder 10 defining a valve seat. An inlet port 11 which is adapted for connection with a supply or input fluid pressure reservoir (not shown) is provided in the housing 2 intersecting with the counterbore 8, and an outlet port 12 which is adapted for connection with the vehicle front brakes (not shown) is also provided in said housing intersecting with the housing shoulder 9. A valve member 13 is provided with a stem portion 14 having an exhaust passage 15 therethrough, and said valve member stem is slidably received in a bore 16 of a valve guide member 17 which is retained against displacement from the lower end of the housing counterbore 8 by a snap ring and groove assembly 18. Seals 19, 20 are carried in the valve guide member 17 in sealing engagement with the housing counterbore 8 and valve stem 14, and a valve spring 21 of negligible force is biased between said valve guide member and the valve member 13 urging said valve member into sealing engagement with the housing valve seat 10 to normally interrupt pressure fluid communication between the inlet and outlet ports 11, 12. An inlet chamber 21a is defined in the housing 2 between the housing counterbore and valve member 13 and between the housing valve seat 10 and valve guide member 17, and said inlet chamber is in open pressure fluid communication with the inlet port 11.

The closure member 3 is provided with a centrally located hub or extension 22 having a free end or abutment portion 23 which extends coaxially into the housing counterbore 7, and a blind bore 24 is provided in said extension intersecting with said free end thereof. The seal 5, as previously mentioned, is peripherally carried in the closure member extension 22 in sealing engagement with the housing counterbore 7, and a control port 25 which is adapted for connection with a foot type or other operator application valve of the vehicle brake system (not shown) is provided in the closure member 3 connecting with the blind bore 24 thereof.

An application member, such as the differential relay piston indicated generally at 26, is provided with a sleeve portion 27 slidably received in the closure member bore 24 and having an upper end 28 defining with said closure member bore an expansible control chamber 29 in open pressure fluid communication with the control port 25, and a radially extending flange portion 30 is integrally formed on said relay piston adjacent to the lower end thereof and slidably received in the housing counterbore 7. An annular expansible control chamber 31 is defined in the housing 2 between the counterbore 7 and the relay piston sleeve 27 and between the relay piston flange 30 and the closure member 3, and an expansible outlet chamber 32 is defined in the housing counterbore 7 between the relay piston 26 and the housing shoulder 9, said outlet chamber being connected in pressure fluid communication with the outlet port 12. Peripheral seals 33, 34 are carried in the relay piston sleeve and flange portions in sealing engagement with the closure member bore 24 and housing counterbore 7, respectively, and a coaxial extension 35 is integrally provided on the lower end of the relay piston 26 extending into the outlet chamber 32 and having a free end or valve seat 36 thereon for movement through the housing bore 6 into actuating engagement with the cooperating valve member 13, as discussed hereinafter. A return spring 37 of negligible compressive force is biased between the relay piston 26 and housing shoulder 9 normally urging said relay piston toward its inoperative position engaging the flange 30 thereof with the closure member abutment 23 and disengaging the relay piston vlave seat 36 from the cooperating valve member 13 thereby communicating the outlet port 12 to atmosphere through the outlet chamber 32 and the valve member exhaust passage 15.

The relay piston 26 is also provided with a pair of coaxial stepped bores 38, 39 having an annular shoulder 40 therebetween, and the larger stepped bore 38 intersects with the upper end 28 of said relay piston while a vent passage 41 is connected between the smaller stepped bore 39 and the relay piston valve seat 36. A connecting passage 42 is provided in the relay piston sleeve 27 connecting between the larger stepped bore 38 and the annular control chamber 31, and a seating member 43 is disposed in said larger stepped bore adjacent to the upper end of said relay piston sleeve against displacement by a snap ring and groove assembly 44. A passage 45 is coaxially provided through the seating member 43 between the control chamber 29 and the larger stepped bore 38 in the relay piston sleeve 27, and a valve seat 46 is provided on said seating member about said passage therein.

A proportioning, modulating or metering valve member 47 is provided with a stem portion 48 which is slidably received in the relay piston smaller stepped bore 39, and a peripheral seal 49 is carried in said proportioning valve stem portion in sealing engagement with said relay piston smaller stepped bore. The proportioning valve stem 48 is integrally formed with a radially extending flange or head portion 50 having a plurality of return flow passages 51 therethrough, and an annular seal or cup member 52 is disposed on the proportioning valve head portion 50 having a flapper or lip portion 53 sealably engaged with said head portion 50 about the return flow passages 51 to normally close said return flow passage. A proportioning, modulating or metering spring 54 is pre-compressed between the proportioning valve 47 and the relay piston shoulders 40 normally urging said proportioning valve upwardly engaging the seal 52 thereof with the cooperating valve seat 46 interrupting pressure fluid communication between the control chambers 29, 31.

It should be noted that the relay piston 26 is provided with an effective control area $A_1$ defined by the sealing engagement of the seal 33 with the closure member bore 24, and said area $A_1$ is subjected to control fluid pressure in the control chamber 29. An annular effective control area $A_2$ which is additive to the area $A_1$ is also provided on the relay piston 26 being defined between the sealing engagement of the seals 33, 34 with the closure member bore and housing counterbore 24, 7, respectively, and said area $A_2$ is subjected to control fluid pressure in the annular control chamber 31. An effective output area $A_3$ which is opposed and predeterminately less than the additive areas $A_1$, $A_2$ is provided on the relay piston 26 being defined between the sealing engagement of the seal 34 with the housing counterbore 7 and the sealing engagement of the relay piston valve seat 36 with the valve member 13, and said area $A_3$ is subjected to the output or applied fluid pressure in the outlet chamber 32. To complete the description of the control valve 1, the sealing engagement of the proportioning valve member 47 with the valve seat 46 of the relay piston seating member 43 defines an effective area $A_4$ on said proportioning valve member which is subjected to control fluid pressure in the control chamber 29, and the sealing engagement of the seal 49 on the proportioning valve member stem 48 with the relay piston smaller stepped bore 39 defines an effective area $A_5$ which is vented to atmosphere at all times through the relay piston vent passage 41.

OPERATION

With the component parts of the control valve 1 positioned as shown in FIG. 1 and as described hereinbefore, control fluid pressure P delivered by the operator actuation of the vehicle brake system foot or application valve (not shown) to the control port and chamber 25, 29 acts on the effective area $A_1$ of the relay piston 26 to establish a control force P $A_1$ urging said realy piston downwardly against its return spring 37 to initially engage its valve seat 36 with the valve member 13 closing the exhaust passage 15 thereof and interrupting communication between the outlet port 12 and the atmosphere. The valve member 13 is thereafter concertedly movable with the relay piston 26 toward a metering position disengaged from the housing valve seat 10 to establish metered pressure fluid communication between the inlet and outlet ports 11, 12 wherein the input or supplied fluid pressure Pi at said inlet port flows through the inlet and outlet chambers 21a, 32 to establish a reduced metered applied or output fluid pressure Po at said outlet port for transmission to the vehicle front axle brakes (not shown). The established output fluid pressure Po at the outlet port 12 acts on the area $A_3$ of the relay piston 26 to establish an output or reaction force $Po\ A_3$ opposing the downward movement thereof in response to the control force $P\ A_1$, and when the reaction force $Po\ A_3$ attains a magnitude substantially balancing the control force $P\ A_1$, the relay piston and valve member 26, 13 are concertedly moved upwardly toward a lapped position wherein said valve member re-engages the housing valve seat 10 interrupting pressure fluid communication between the inlet and outlet ports 11, 12 while the relay piston valve seat 36 remains engaged with said valve member to interrupt pressure fluid communication between said outlet port and the atmosphere. From the graph of FIG. 2, it is obvious that increases in the control fluid pressure P along the line OS but less than the predetermined value M, as discussed hereinabove, will result in proportionally reduced increases in the output fluid pressure $Po$ in a predetermined ratio therewith, as shown by the line ON, wherein: $Po = P\ A_1/A_3$.

Figure 2:
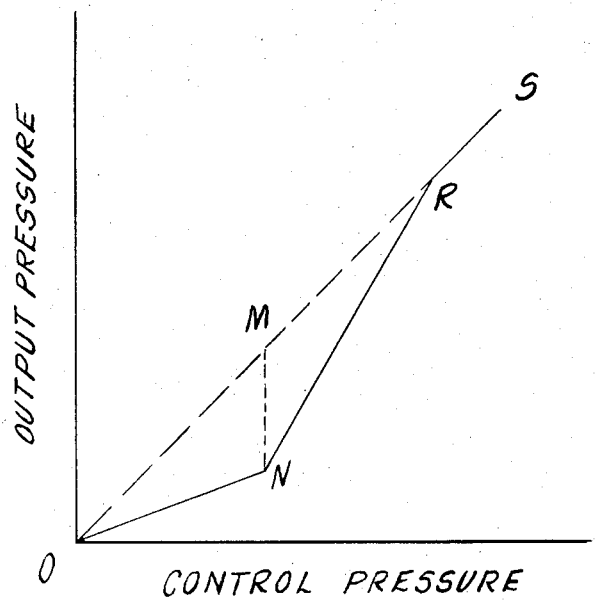
FIG. 2 is a graphical representation illustrating the applied or output fluid pressure effected by the control valve of FIG. 1 in response to the control fluid pressure selectively subjected thereto.

When the control fluid pressure P at the control port 25 is increased in excess of the predetermined value M but less than the predetermined value R, as shown by the line MR in the graph of FIG. 2, the control force $P\ A_1$ is correspondingly increased, and the input force $P\ A_4$ of the control fluid pressure P acting on the area $A_4$ of the proportioning valve 47 overcomes the opposing force Fs of the proportioning spring 54 to move said proportioning valve downwardly in the relay piston 26 toward a proportioning or metering position disengaging the proportioning valve seal 52 from the valve seat 46 to effect metered pressure fluid communication between the control chambers 29, 31 and establish a proportionally reduced or ratio control fluid pressure $Pr$ in the control chamber 31 acting on the output area $A_4 - A_5$ of said proportioning valve to establish an output force $Pr\ (A_4 - A_5)$ which is additive to the spring force Fs and opposed to the input force $P\ A_4$. The increased ratio control fluid pressure Pr in the control chamber 31 effects a corresponding increase in the output force $Pr\ (A_4 - A_5)$, and when the increased output force $Pr\ (A_4 - A_5)$ and the additive spring force Fs balance the opposed input force $P\ A_4$, the proportioning valve 47 is moved upwardly to re-engage its seal 52 in lapped relation with the valve seat 46 again interrupting pressure fluid communication between the control chambers 29, 31. The relationship between the control and ratio control fluid pressures P, Pr is as follows: $Pr = (P\ A_4 - Fs)/(A_4 - A_5)$.

Of course, when the magnitude of the control fluid pressure P is between the predetermined values M, R, as shown on the line MR in the graph of FIG. 2, the correspondingly established ratio control fluid pressure Pr in the control chamber 31 acts on the area $A_2$ of the relay piston 26 to establish a ratio or booster control force $PrA_2$ which is additive to the control force $PA_1$ to assist the metering or proportioning actuation of said relay piston and the valve member 13 and effect a corresponding increase in the established output fluid pressure $Po$, as previously described, in a different predetermined ratio therewith. For instance, from the graph of FIG. 2, it is obvious that increases in the control fluid pressure P between the predetermined values M, R, as shown by the line MR, will result in proportionally reduced increases in the output fluid pressure $Po$ in another predetermined ratio therewith, as shown by the line NR, wherein: $Po = (PA_1 + PrA_2)/A_3$.

When the magnitude of the control and output fluid pressures P, Po exceed the predetermined value R, as shown by the line RS in the graph of FIG. 2, the input force $PA_4$ acting on the proportioning valve 47 overcomes the output force $Pr\ (A_4 - A_5)$ and additive spring force Fs acting thereon to move said proportioning valve downwardly toward a passage opening or open pressure fluid communication position engaging the lower end of the proportioning valve stem 48 with the end wall of the relay piston smaller stepped bore 39 and disengaging the proportioning valve seal 52 from the valve seat 46 to establish open pressure fluid communication between the control chambers 29, 31 and blend the control and ratio control fluid pressures P, Pr. Of course, when the control and ratio control fluid pressures P, Pr are blended, the ratio control force $PrA_2$ is correspondingly increased to assist the control force $PA_1$ and effect further actuation of the relay piston 26 and valve member 13 correspondingly increasing the established output fluid pressure Po and reaction force $Po\ A_3$, as previously described.

When the disired vehicle braking effort is attained by actuation of the control valve 1, as described hereinbefore, the control fluid pressure P at the control port 25 is vented to atmosphere which eliminates the control force $PA_1$ and the input force $PA_4$ respectively acting on the relay piston 26 and proportioning valve 47, and the additive output and spring forces $Pr\ (A_4 - A_5)$, Fs acting on said proportioning valve returns said proportioning valve to its original position re-engaging the proportioning valve seal 52 with the valve seat 46. At the same time, the exhaustion of the control fluid pressure P establishes a pressure differential across the proportioning valve 47, and the ratio control fluid pressure in the chamber 31 returns therefrom through the passage 42 and the larger stepped bore 38 of the relay piston 26 displacing the lip portion 53 of the proportioning valve seal 52 from engagement with said proportioning valve and exhausts through the control chamber 29 and control port 25 thereby eliminating the output force $Pr\ (A_4 - A_5)$ acting on said proportioning valve and also the ratio control force $PrA_2$ acting on said relay piston. Upon the exhaustion of the control and ratio control fluid pressures P, Pr, the reaction force $Po\ A_3$ and the force of the relay piston return spring 37 are effective to urge the relay piston 26 upwardly toward its original position into re-engagement with the closure member abutment 23, and this upward movement disengages the relay piston seat 36 from the valve member 13 to open the valve member exhaust passage 15 effecting the exhaustion of the established output fluid pressure Po from the outlet port 12 through the outlet chamber 32 and said valve member exhaust passage thereby eliminating the reaction force $Po\ A_3$. Of course, upon the disengagement of the relay piston valve seat 36 from the valve member 13, the valve member spring 21 urges said valve member toward engagement with the housing valve seat 10 to again interrupt pressure fluid communication between the inlet and outlet ports 11, 12.

From the foregoing, it is apparent that a control valve 1 meeting the objects and advantageous features set forth hereinbefore, as well as others, is disclosed and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, application means movable in said housing for controlling the application therethrough of supplied fluid pressure including a pair of additive areas for respective subjection to control fluid pressure, said application means being initially movable in response to control fluid pressure less than a predetermined value acting on one of said areas toward a position in said housing effecting the application therethrough of the supplied fluid pressure to establish an applied fluid pressure in a predetermined ratio with the control fluid pressure, and modulating means movable in said application means between said areas for performing modulating operations on the control fluid pressure under preselected conditions, said modulating means being operable generally in response to control fluid pressure in excess of the predetermined value but less than another predeterminately greater predetermined value to effect a modulated reduced application thereof to the other of said areas and thereby further actuate said application means to increase the applied fluid pressure in another predetermined ratio with the control fluid pressure, and said modulating means also being further operable in response to control fluid pressure in excess of the other predetermined value to blend the control fluid pressure and the modulated reduced application thereof respectively acting on said one and other areas and further actuate said application means to substantially equate the applied and control fluid pressures.

2. A control valve comprising a housing, application means movable in said housing for controlling the application therethrough of supplied fluid pressure including a pair of additive areas for respective subjection to control fluid pressure, and passage means in said application means communicating said areas, said application means being initially movable in response to control fluid pressure less than a predetermined value acting on one of said areas toward a position in said housing effecting the application therethrough of the supplied fluid pressure to establish an applied fluid pressure in a predetermined ratio with the control fluid pressure acting on said one area, proportioning valve means movable in said passage means for performing proportioning operations on the control fluid pressure under preselected conditions, said proportioning valve means being operable generally in response to control fluid pressure acting thereon in excess of the first named predetermined value but less than another predeterminately greater predetermined value to effect a proportionally reduced application of the control fluid pressure through said passage means to act on the other of said areas and thereby effect further actuation of said application means to increase the applied fluid pressure in another predtermined ratio with the control fluid pressure, and said proportioning valve means also being further movable in response to control fluid pressure acting thereon in excess of the other predetermined value toward a passage means opening position to blend the control fluid pressure and the proportionally reduced application thereof respectively acting on said one and other chambers and thereby effect further actuation of said application means to substantially equate the control and applied fluid pressures.

3. A control valve according to claim 2, wherein said application means defines with said housing a pair of control chambers for respective subjection to the control fluid pressure, said areas being respectively within said control chambers, and said passage means being connected between said control chambers, said proportioning valve means being actuated in response to the control fluid pressure in one of said control chambers acting on said one area to effect the proportionally reduced application of the control fluid pressure through said passage means to the other of said control chambers and acting on the other of said areas.

4. A control valve according to claim 2, wherein said application means defines with said housing a third chamber subjected to the applied fluid pressure and opposed to said control chambers, and a third area on said application means within said third chamber and opposed to said one and other areas.

5. A control valve comprising a housing, a differential piston movable in said housing and defining therewith a pair of control chambers and an opposed outlet chamber, including a pair of additive smaller surfaces in said control chambers and an opposing larger surface in said outlet chamber, an inlet chamber in said housing connected with said outlet chamber, valve means movable in said housing for actuating engagement with said differential piston and controlling pressure fluid communication between said inlet and outlet chambers, said differential piston being movable in response to fluid pressure less than a predetermined value delivered to one of said control chambers to engage and actuate said valve means toward a position in said housing effecting pressure fluid communication between said inlet and outlet chambers and establishing fluid pressure in said outlet chamber in a predetermined ratio with that in said one control chamber, metering means movable in said differential piston means for controlling pressure fluid communication between said control chambers, said metering means being movable in response to fluid pressure between the first named predetermined value and another predeterminately greater predetermined value delivered to said one control chamber toward a position in said differential piston effecting metered pressure fluid communication between said control chambers and establishing a reduced metered fluid pressure in the other of said control chambers to further actuate said differential piston and valve means and increase the fluid pressure in said outlet chamber in another predetermined ratio with that delivered to said one control chamber, and said metering means also being movable in response to fluid pressure in excess of the other predetermined value delivered to said one control chamber toward an open position in said differential piston blending the fluid pressures in said one and other control chambers to further actuate said differential piston and valve means and increase the fluid pressure in said outlet chamber to a value substantially equal to the blended fluid pressures in said one and other control chambers.

6. A control valve comprising a housing having inlet, outlet and control ports therein, valve means movable in said housing for controlling pressure fluid communication between said inlet and outlet ports, valve control means movable in said housing between said outlet and control ports for engagement with said valve means, a pair of opposed areas on said valve control means for respective subjection to fluid pressure at said control and outlet ports, said valve control means being movable in response to fluid pressure less than a predetermined value at said control port acting on one of said areas to engage and actuate said valve means toward a position effecting pressure fluid communication between said inlet and outlet ports and establishing fluid pressure at said outlet port acting on the other of said areas in a predetermined ratio with that at said control port, a third area on said valve control means additive to said one area and opposed to said other area, passage means in said valve control means communicating said one and third areas, and proportioning valve means movable in said valve control means for controlling said passage means, said proportioning valve means being movable in response to fluid pressure at said control port between the first named predetermined value and another predeterminately greater predetermined value toward a position in said passage means effecting the application therethrough of a proportionally reduced fluid pressure to said third area further actuating valve control means and valve means to increase the fluid pressure at said outlet port acting on said other area in another predetermined ratio with the fluid pressure at said control port and the proportionally reduced application thereof respectively acting on said one and third areas, and said proportioning valve means also being movable in response to fluid pressure in excess of the other predetermined value at said control port toward an open position in said passage means to blend the fluid pressure at said control port and the reduced application thereof respectively acting on said one and third areas and further actuate said valve control means and valve means to thereafter substantially equate the fluid pressure at said outlet port with that at said control port.

\* \* \* \* \*

UNITED STATES PATENT OFFICE
CERTIFICATE OF CORRECTION

Patent No. 3,771,836　　　　Dated November 13, 1973

Inventor(s) Richard C. Bueler

It is certified that error appears in the above-identified patent and that said Letters Patent are hereby corrected as shown below:

[75] Delete "Valley". [57] Line 2 of the "Abstract", delete "a", first occurrence. Column 3, line 41, "vlave" should read -- valve --; Column 6, line 1, "magnitude" should read -- magnitudes --; line 22, "disired" should read -- desired --. Column 7, line 59, "predtermined" should read -- predetermined --.

Signed and sealed this 18th day of June 1974.

(SEAL)
Attest:

EDWARD M. FLETCHER, JR.　　　　C. MARSHALL DANN
Attesting Officer　　　　　　　　Commissioner of Patents